(12) United States Patent
Minahan et al.

(10) Patent No.: US 9,340,231 B1
(45) Date of Patent: May 17, 2016

(54) ENERGY-ABSORBING APPARATUS

(71) Applicant: Google Inc., Mountain View, CA (US)

(72) Inventors: Jason Minahan, Mountain View, CA (US); Felix Jose Alvarez Rivera, San Jose, CA (US); Daniel Lynn Larner, San Jose, CA (US); Thomas Daniel, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/455,252

(22) Filed: Aug. 8, 2014

(51) Int. Cl.
*B60J 7/00* (2006.01)
*B62D 21/15* (2006.01)

(52) U.S. Cl.
CPC .................................. *B62D 21/152* (2013.01)

(58) Field of Classification Search
CPC ..... F01D 25/24; Y02T 50/971; Y02T 10/126; B64C 2027/002; B64C 27/001; E01C 21/00; G11B 23/087; B65D 77/006; E05Y 2900/20; F02M 31/135
USPC ...................................................... 296/187.09
See application file for complete search history.

(56) References Cited

U.S. PATENT DOCUMENTS

| | | | | |
|---|---|---|---|---|
| 4,018,466 A * | 4/1977 | Norlin | | 293/122 |
| 4,061,384 A * | 12/1977 | Montgomery et al. | | 293/109 |
| 4,427,189 A * | 1/1984 | Kimura et al. | | 267/139 |
| 4,569,865 A * | 2/1986 | Placek | | 428/31 |
| 4,652,031 A * | 3/1987 | Loren et al. | | 293/120 |
| 4,722,563 A * | 2/1988 | Loren et al. | | 293/120 |
| 4,905,681 A * | 3/1990 | Glascock | | 128/888 |
| 4,988,137 A * | 1/1991 | Fleming | | 293/109 |
| 5,067,759 A * | 11/1991 | Fleming | | 293/109 |
| 5,100,187 A * | 3/1992 | Loren | | 293/110 |
| 5,106,137 A * | 4/1992 | Curtis | | 293/107 |
| 5,114,198 A * | 5/1992 | Yamashita et al. | | 293/120 |
| 5,139,297 A * | 8/1992 | Carpenter et al. | | 293/132 |
| 5,219,197 A * | 6/1993 | Rich et al. | | 293/120 |
| 5,290,079 A * | 3/1994 | Syamal | | 293/120 |
| 5,385,375 A * | 1/1995 | Morgan et al. | | 293/109 |
| 5,425,561 A * | 6/1995 | Morgan | | 293/120 |
| 5,746,419 A * | 5/1998 | McFadden et al. | | 267/140 |
| 5,799,991 A * | 9/1998 | Glance | | 293/121 |
| 5,884,960 A * | 3/1999 | Wycech | | 296/146.6 |
| 5,997,057 A * | 12/1999 | Gasko et al. | | 293/102 |
| 6,093,468 A | 7/2000 | Toms et al. | | |
| 6,168,226 B1 * | 1/2001 | Wycech | | 296/146.6 |
| 6,179,353 B1 * | 1/2001 | Heatherington et al. | | 293/122 |
| 6,270,131 B1 * | 8/2001 | Martinez et al. | | 293/132 |
| 6,318,775 B1 * | 11/2001 | Heatherington et al. | | 293/120 |
| 6,416,094 B1 * | 7/2002 | Cherry | | 293/120 |
| 6,596,200 B1 * | 7/2003 | Ogawa et al. | | 252/512 |
| 6,712,410 B2 * | 3/2004 | Kudelko et al. | | 293/102 |
| 6,793,256 B2 * | 9/2004 | Carley et al. | | 293/109 |
| 6,857,690 B2 * | 2/2005 | Vismara et al. | | 296/187.09 |
| 7,044,514 B2 * | 5/2006 | Mustafa et al. | | 293/109 |
| 7,063,376 B2 * | 6/2006 | Ori et al. | | 296/187.01 |
| 7,681,700 B2 * | 3/2010 | Ginja et al. | | 188/377 |
| 2014/0151171 A1 | 6/2014 | Sato et al. | | |

\* cited by examiner

*Primary Examiner* — Kiran B Patel
(74) *Attorney, Agent, or Firm* — McDonnell Boehnen Hulbery & Berghoff LLP

(57) ABSTRACT

In one example, an apparatus includes a casing configured to be coupled to a frame of a vehicle at a first end of the casing. The casing comprises friable foam having a first stiffness. The apparatus further includes a void within the casing defined by (i) an inner wall of the casing and (ii) an opening at a second end of the casing. The apparatus further includes an insert positioned within the void, the insert comprising a material having a second stiffness that is different from the first stiffness.

11 Claims, 8 Drawing Sheets

ENERGY-ABSORBING APPARATUS

BACKGROUND

Unless otherwise indicated herein, the materials described in this section are not prior art to the claims in this application and are not admitted to be prior art by inclusion in this section.

Bumpers and airbags are examples of vehicle systems designed to protect vehicles, vehicle occupants, or other objects. Vehicle bumpers may be installed on a front end and/or a rear end of a vehicle to absorb potential impact forces. Interior airbags may deploy when the vehicle detects contact with another object to prevent injury to occupants of the vehicle.

SUMMARY

In one example, an apparatus includes a casing configured to be coupled to a frame of a vehicle at a first end of the casing. The casing comprises friable foam having a first stiffness. The apparatus further includes a void within the casing defined by (i) an inner wall of the casing and (ii) an opening at a second end of the casing. The apparatus further includes an insert positioned within the void, the insert comprising a material having a second stiffness that is different from the first stiffness.

In another example, a vehicle includes a frame and a passenger compartment coupled to the frame. The vehicle also includes an apparatus that includes a casing coupled to the frame at a first end of the casing so that the casing is adjacent to an exterior of the passenger compartment. The casing comprises friable foam having a first stiffness and a void defined by (i) an inner wall of the casing and (ii) an opening at a second end of the casing. The apparatus further includes an insert positioned within the void of the casing, the insert comprising a material having a second stiffness different from the first stiffness.

In yet another example, an apparatus includes an inner casing configured to be coupled to a frame of a vehicle at a back end of the inner casing so that the inner casing is adjacent to an exterior of a passenger compartment of the vehicle. The inner casing comprises friable foam having a first stiffness. The apparatus further includes a first void within the inner casing defined by (i) an inner wall of the inner casing and (ii) an opening at a front end of the inner casing. The apparatus further includes an insert positioned within the first void, the insert comprising a second friable foam having a second stiffness that is different from the first stiffness and an outer casing configured to be placed over the front end of the inner casing. The apparatus further includes a second void within the outer casing defined by (i) an inner wall of the inner casing and (ii) an opening at a front end of the inner casing.

These as well as other aspects, advantages, and alternatives, will become apparent to those of ordinary skill in the art by reading the following detailed description, with reference where appropriate to the accompanying figures.

DETAILED DESCRIPTION

Figure 1:
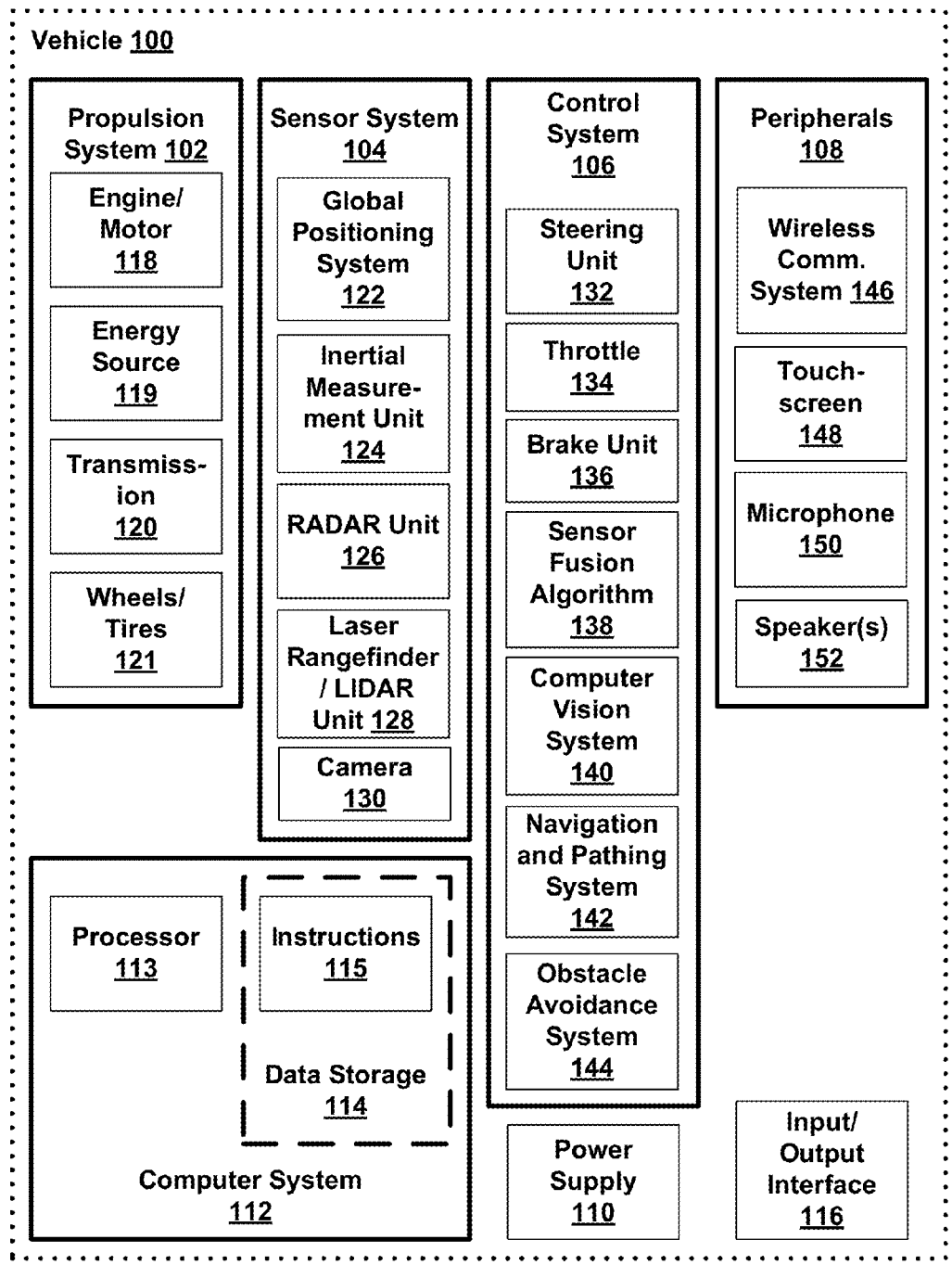
FIG. 1 is a functional block diagram illustrating a vehicle, according to an example embodiment.

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

During operation of a vehicle, it is possible that the vehicle may impact objects, and in some cases it is possible that the vehicle may even impact a person or pedestrian. Therefore, an energy absorbing apparatus coupled to the vehicle is described which aims to reduce or mitigate any potential injury caused by impact with a person or pedestrian.

Within examples, an apparatus may include an inner casing configured to be coupled to a frame of a vehicle (e.g., a car). The inner casing may include a first energy-absorbing material such as a first friable foam having a first stiffness. The apparatus may also include an insert configured to be placed into a void of the inner casing. The insert may include a second energy-absorbing material such as a second energy-absorbing friable foam having a second stiffness that is different from the first stiffness of the inner casing. The insert may be placed into the void and the apparatus may be coupled to the vehicle. The insert may also include one or more structures configured to collapse to absorb an impact force applied to the apparatus during operation of the vehicle. Since the second stiffness of the insert is different from the first stiffness of the inner casing, the insert can be used to change an apparent stiffness of an area of the inner casing containing the insert while allowing some of the inner casing to retain bulk material properties of the first energy-absorbing material.

The apparatus may further include an outer casing that is placed over the inner casing. In various examples, the outer casing may be made up of different materials, including the first and/or second energy-absorbing materials. The outer casing may include a void that is configured to receive a component of the vehicle, such as a sensor or a headlight. The insert positioned within the inner casing may be positioned behind the component so that an impact force applied to the component may be absorbed by the insert.

Depending on a location of the insert within the inner casing and a difference in stiffness between the inner casing and the insert, the apparatus is configured to beneficially guide motion of an object or a person upon impact in an effort to minimize any injury to the person. For example, when the apparatus is coupled to the vehicle, the insert (i.e., the void) could be located at a lower portion of the apparatus near a driving surface and the insert could have an elongated horizontal shape substantially parallel to the driving surface. If the insert is stiffer than the surrounding inner casing, an object (e.g., the person) that contacts the apparatus near the insert may be guided off of the ground and onto a softer area of the inner casing and/or vehicle, thereby mitigating damage or injury to the person or object that may occur if the person or object remains near the driving surface. Or, the apparatus may include wedge-shaped inserts located on opposite sides of the inner casing near a front end of the apparatus. An object (e.g., the person) that contacts the vehicle near one of the wedge-shaped inserts may be redirected toward a softer center region of the apparatus and/or the vehicle, thereby mitigating damage or injury to the person or object. In yet another example, a soft insert may be placed behind a sensor or other component of the vehicle placed near a front end of the vehicle so that the soft insert absorbs an impact force applied to the sensor or component, possibly mitigating damage or injury to the impacted person or object.

Many parameters of the disclosed embodiments allow for variation in properties. For example, hardness, toughness, foam density, foam volume, shape, position, etc., of the various energy-absorbing materials and/or the components of the apparatus may be varied to absorb impact forces at different rates and/or to different extents, or to pivot or guide an impacted object in a particular manner. The embodiments herein may therefore be tuned to specific purposes and applications, depending on the needs of the particular vehicle in question and the particular application.

Additionally, the embodiments disclosed herein may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a roller coaster, trolley, tram, or train car, among other examples.

Referring now to the figures, FIG. 1 is a functional block diagram illustrating a vehicle 100, according to an example embodiment. The vehicle 100 could be configured to operate fully or partially in an autonomous mode. For example, the vehicle 100 could be self-controlling while in the autonomous mode, and may be configured to determine a current state of the vehicle 100, determine an environment of the vehicle 100, determine a predicted behavior of at least one other vehicle in the environment, determine a confidence level that may correspond to a likelihood of the at least one other vehicle to perform the predicted behavior, and control the vehicle 100 based on the determined information. While in autonomous mode, the vehicle 100 may be configured to operate without human interaction.

The vehicle 100 could include various subsystems such as a propulsion system 102, a sensor system 104, a control system 106, one or more peripherals 108, as well as a power supply 110, a computer system 112, and an input/output interface 116. The vehicle 100 may include more or fewer subsystems and each subsystem could include multiple elements. Further, each of the subsystems and elements of the vehicle 100 could be interconnected. Thus, one or more of the described functions of the vehicle 100 may be divided into additional functional or physical components, or combined into fewer functional or physical components. In some further examples, additional functional and/or physical components may be added to the examples illustrated by FIG. 1.

The propulsion system 102 may include components configured to provide motion for the vehicle 100. In an example embodiment, the propulsion system 102 could include an engine/motor 118, an energy source 119, a transmission 120, and wheels/tires 121. The engine/motor 118 could be any combination of an internal combustion engine, an electric motor, a steam engine, a Stirling engine, or other types of engines and/or motors. In some embodiments, the engine/motor 118 may be configured to convert the energy source 119 into mechanical energy. In some embodiments, the propulsion system 102 could include multiple types of engines and/or motors. For instance, a gas-electric hybrid car could include a gasoline engine and an electric motor. Other examples are possible.

The energy source 119 could represent a source of energy that may, in full or in part, power the engine/motor 118. That is, the engine/motor 118 could be configured to convert the energy source 119 into mechanical energy. Examples of energy sources 119 include gasoline, diesel, other petroleum-based fuels, propane, other compressed gas-based fuels, ethanol, solar panels, batteries, and other sources of electrical power. The energy source(s) 119 could additionally or alternatively include any combination of fuel tanks, batteries, capacitors, and/or flywheels. The energy source 119 could also provide energy for other systems of the vehicle 100.

The transmission 120 could include elements that are configured to transmit mechanical power from the engine/motor 118 to the wheels/tires 121. To this end, the transmission 120 could include a gearbox, a clutch, a differential, and drive shafts. The transmission 120 could include other elements. The drive shafts could include one or more axles that could be coupled to the one or more wheels/tires 121.

The wheels/tires 121 of vehicle 100 could be configured in various formats, including a unicycle, a bicycle/motorcycle, a tricycle, or a car/truck four-wheel format. Other wheel/tire geometries are possible, such as those including six or more wheels. Any combination of the wheels/tires 121 of the vehicle 100 may be configured to rotate differentially with respect to other wheels/tires 121. The wheels/tires 121 could represent at least one wheel that is attached to the transmission 120 and at least one tire coupled to a rim of a wheel that could make contact with a driving surface. The wheels/tires 121 could include any combination of metal and rubber, or another combination of materials.

The sensor system 104 may include a number of sensors configured to sense information about an environment of the vehicle 100. For example, the sensor system 104 could include a Global Positioning System (GPS) 122, an inertial measurement unit (IMU) 124, a RADAR unit 126, a laser rangefinder/LIDAR unit 128, and a camera 130. The sensor system 104 could also include sensors configured to monitor internal systems of the vehicle 100 (e.g., an $O_2$ monitor, a fuel gauge, or an engine oil pressure gauge). Other sensors are possible as well.

One or more of the sensors included in the sensor system 104 could be configured to be actuated separately and/or collectively in order to modify a position and/or an orientation of the one or more sensors.

The Global Positioning System (GPS) 122 may be any sensor configured to determine a location of the vehicle 100. To this end, the GPS 122 could include a transceiver configured to provide information regarding the position of the vehicle 100 with respect to the Earth.

The IMU 124 could include any combination of sensors (e.g., accelerometers and gyroscopes) configured to sense position and orientation changes of the vehicle 100 based on inertial acceleration.

The RADAR unit 126 may represent a system that utilizes radio signals to sense objects within the environment of the vehicle 100. In some embodiments, in addition to sensing the objects, the RADAR unit 126 may additionally be configured to sense the speed and/or direction of motion of the objects.

Similarly, the laser rangefinder/LIDAR unit 128 may be any sensor configured to sense objects in the environment of the vehicle 100 by using lasers. In an example embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 could include one or more devices configured to capture a plurality of images of the environment of the vehicle 100. The camera 130 could be configured to captures still frames and/or continuous video.

The control system 106 may be configured to control operation of the vehicle 100 and its components. Accordingly, the control system 106 could include various elements including a steering unit 132, a throttle 134, a brake unit 136, a sensor fusion algorithm 138, a computer vision system 140, a navigation and pathing system 142, and an obstacle avoidance system 144.

The steering unit 132 could represent any combination of mechanisms that may be configured to adjust a direction of motion of the vehicle 100. For example, a steering wheel or steering column may be mechanically coupled to the wheels/tires 121 and turning the steering wheel or steering column may cause the wheels/tires 121 to change the direction of motion of the vehicle 100.

The throttle 134 could be configured to control, for instance, the operating speed of the engine/motor 118 and, in turn, control the speed of the vehicle 100. For example, the throttle 134 may be configured to increase or decrease a rate of energy conversion of the energy source 119 that is converted to mechanical energy by the engine/motor 118.

The brake unit 136 could include any combination of mechanisms configured to decelerate the vehicle 100. The brake unit 136 could use disc or drum brakes that use friction to slow rotation of the wheels/tires 121. In other embodiments, the brake unit 136 could convert kinetic energy of the wheels/tires 121 to electric current. The brake unit 136 may take other forms as well.

The sensor fusion algorithm 138 may be an algorithm configured to accept data from the sensor system 104 as an input. (The sensor fusion algorithm 138 may be data representing the sensor fusion algorithm stored in the data storage 114.) The input data may include, for example, data representing information sensed by the sensors of the sensor system 104. The sensor fusion algorithm 138 could include, for instance, a Kalman filter, a Bayesian network, or another algorithm. The sensor fusion algorithm 138 could further provide various assessments based on the data from the sensor system 104. In an example embodiment, the assessments could include evaluations of individual objects and/or features in the environment of vehicle 100, an evaluation of a particular situation, or evaluations of possible impacts based on the particular situation. Other assessments are possible.

The computer vision system 140 may be any system configured to process and analyze images captured by the camera 130 in order to identify objects or features in the environment of vehicle 100, including traffic signals, roadway boundaries, and obstacles. The computer vision system 140 could use an object recognition algorithm, a Structure From Motion (SFM) algorithm, video tracking, and other computer vision techniques. In some embodiments, the computer vision system 140 could be additionally configured to map an environment, track objects, or estimate the speed of objects.

The navigation and pathing system 142 may be any system configured to determine a driving path for the vehicle 100. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 could represent a control system configured to identify, evaluate, and avoid or otherwise negotiate potential obstacles in the environment of the vehicle 100.

The control system 106 may additionally or alternatively include components other than those shown and described.

Peripherals 108 may be configured to receive input data or provide outputs, including to or from external sensors, other vehicles, and other computer systems. For example, peripherals 108 could include a wireless communication system 146, a touchscreen 148, a microphone 150, and a speaker 152.

In one example, the wireless communication system 146 could be configured to wirelessly communicate with one or more devices directly or via a communication network. For example, the wireless communication system 146 could use 3G cellular communication, such as CDMA, EVDO, GSM/GPRS, or 4G cellular communication, such as WiMAX or LTE. Alternatively, the wireless communication system 146 could communicate with a wireless local area network (WLAN), for example, using WiFi. In some embodiments, the wireless communication system 146 could communicate directly with a device, for example, using an infrared link, Bluetooth, or ZigBee. Other wireless protocols, such as various vehicular communication systems, are possible within the context of the disclosure. For example, the wireless communication system 146 could include one or more dedicated short range communications (DSRC) devices that could include public and/or private data communications between vehicles and/or roadside stations.

In an example embodiment, the touchscreen 148 may be configured to display information, including information describing a state of the vehicle 100. The input/output interface 116 could also be configured to accept input from the touchscreen 148. The touchscreen 148 may be configured to sense a position and/or a movement of a finger via capacitive sensing, resistance sensing, or a surface acoustic wave process, among other possibilities. The touchscreen 148 may be capable of sensing finger movement in a direction parallel or planar to the touchscreen surface, or in a direction normal to the touchscreen surface, and may also be capable of sensing a level of pressure applied to the surface of the touchscreen 148. The touchscreen 148 may be formed of one or more translucent or transparent insulating layers and one or more translucent or transparent conducting layers. The touchscreen 148 may take other forms as well.

The microphone 150 may be configured to detect sound waves (e.g., a voice command) and convert the sound waves into audio signals for use by the computer system 112. Similarly, the speakers 152 may be configured to receive audio signals and convert the audio signals into sound waves.

The power supply 110 may provide power to various components of the vehicle 100 and could represent, for example, a rechargeable lithium-ion or lead-acid battery. In some embodiments, one or more banks of such batteries could be configured to provide electrical power to the vehicle 100. Other power supply components and configurations are possible. In some embodiments, the power supply 110 and the energy source 119 could be implemented together, as in some all-electric cars.

Many or all of the functions of the vehicle 100 could be controlled by the computer system 112. The computer system 112 may include at least one processor 113 (which could include at least one microprocessor) that executes the instructions 115 stored in a non-transitory computer readable medium, such as the data storage 114. The computer system 112 may also represent a plurality of processors or computing devices that may serve to control individual components or subsystems of the vehicle 100 in a distributed fashion.

In some embodiments, the data storage 114 may contain the instructions 115 (e.g., program logic) executable by the processor 113 to execute various functions of vehicle 100, including those described above in connection with FIG. 1. The data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by the vehicle 100 and the computer system 112 during the operation of the vehicle 100 in the autonomous, semi-autonomous, and/or manual modes.

The computer system 112 may control the function of the vehicle 100 based on inputs received from various subsystems (e.g., the propulsion system 102, the sensor system 104, and the control system 106), as well as from the input/output interface 116. For example, the computer system 112 may utilize input from the control system 106 in order to control the steering unit 132 to avoid an obstacle detected by the sensor system 104 and the obstacle avoidance system 144. In an example embodiment, the computer system 112 could be configured to provide control over many aspects of the vehicle 100 and its subsystems.

The vehicle 100 may include an input/output interface 116 for providing information for output or receiving input from the peripherals 108. The input/output interface 116 could control or enable control of content and/or a layout of interactive images that could be displayed on the touchscreen 148. Further, the input/output interface 116 could include one or more input/output devices within the set of peripherals 108, such as the wireless communication system 146, the touchscreen 148, the microphone 150, and the speaker 152.

Although FIG. 1 shows various components of the vehicle 100, i.e., the wireless communication system 146, the computer system 112, the data storage 114, and the input/output interface 116, as being integrated into the vehicle 100, one or more of these components could be mounted or associated separately from the vehicle 100. For example, the data storage 114 could, in part or in full, exist separate from the vehicle 100. Thus, the vehicle 100 could be provided in the form of device elements that may be located separately or together. The device elements that make up the vehicle 100 could be communicatively coupled together in a wired and/or wireless fashion.

Figure 2:
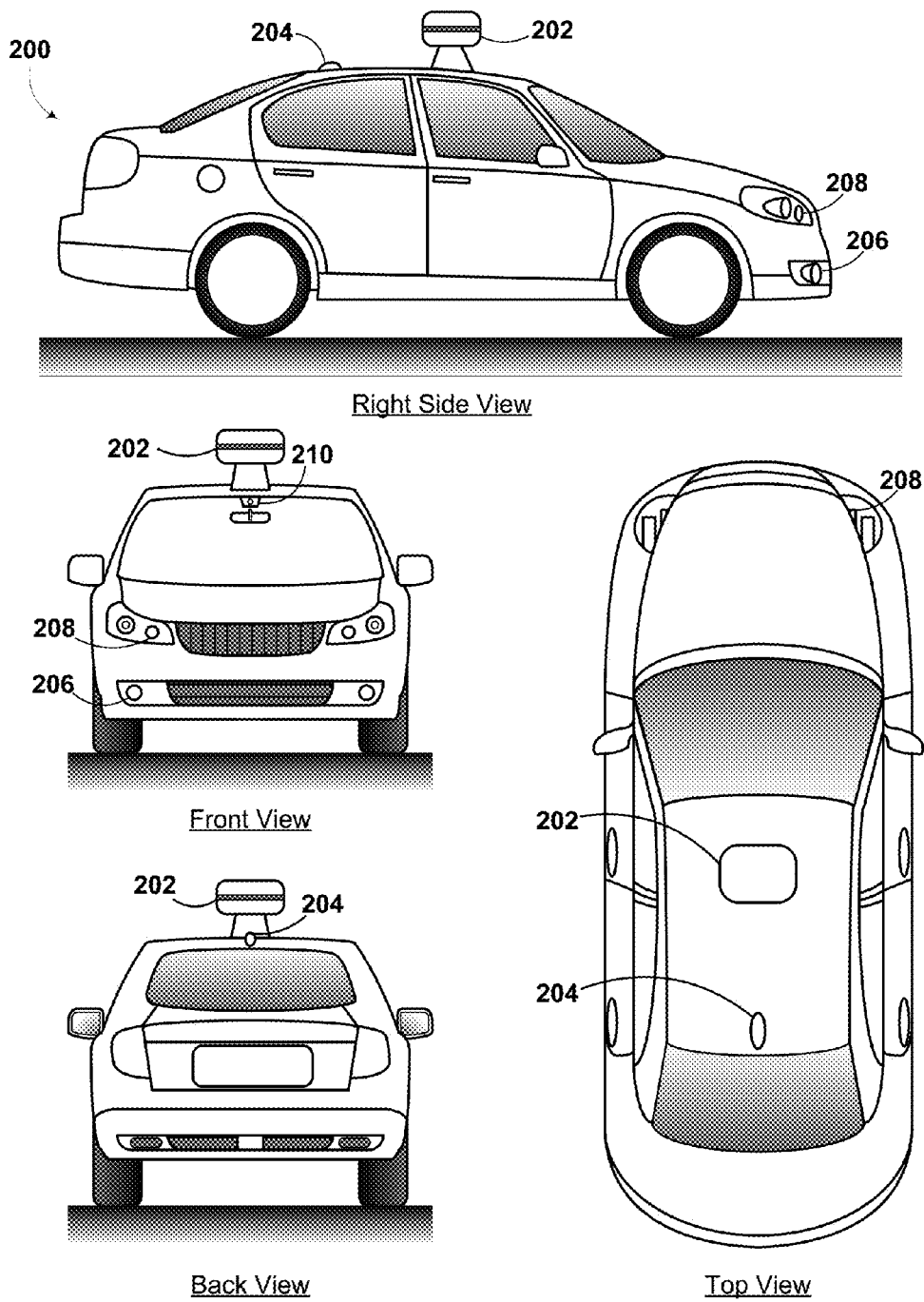
FIG. 2 depicts an example vehicle.

FIG. 2 depicts an example vehicle 200 that could be similar to the vehicle 100 described in FIG. 1. Although the vehicle 200 is illustrated in FIG. 2 as a car, other embodiments are possible. For instance, the vehicle 200 could represent a truck, a van, a semi-trailer truck, a motorcycle, a golf cart, an off-road vehicle, or a farm vehicle, among other examples.

In some embodiments, the vehicle 200 could include a sensor unit 202, a wireless communication system 204, a LIDAR unit 206, a laser rangefinder unit 208, and a camera 210. The elements of the vehicle 200 could include some or all of the elements described as part of the vehicle 100, depicted in FIG. 1.

The sensor unit 202 could include one or more different sensors configured to capture information about an environment of the vehicle 200. For example, the sensor unit 202 could include any combination of cameras, RADARs, LIDARs, range finders, and acoustic sensors. Other types of sensors are possible. In an example embodiment, the sensor unit 202 could include one or more movable mounts that could be configured to adjust the orientation of one or more sensors in the sensor unit 202. In one embodiment, the movable mount could include a rotating platform that could scan sensors so as to obtain information from many directions around the vehicle 200. In another embodiment, the movable mount of the sensor unit 202 could be moveable in a scanning fashion within a particular range of angles and/or azimuths. The sensor unit 202 could be mounted atop a roof of the vehicle 200, for instance, however other mounting locations are possible. Additionally, the sensors of the sensor unit 202 could be distributed in different locations and need not be in a single location. Some possible sensor types and mounting locations include the LIDAR unit 206 and the laser rangefinder unit 208, as depicted in FIG. 2. Furthermore, each sensor of the sensor unit 202 could be configured to be moved or scanned independently of other sensors of the sensor unit 202.

The wireless communication system 204 could be located on a roof of the vehicle 200 as depicted in FIG. 2. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other communication standards directed towards intelligent transport systems.

The camera 210 may be any camera (e.g., a still camera, a video camera, etc.) configured to capture a plurality of images of the environment of the vehicle 200. To this end, the camera 210 may be configured to detect visible light, or may be configured to detect light from other portions of an electromagnetic spectrum, such as infrared or ultraviolet light. Other types of cameras are possible as well.

The camera 210 may be a two-dimensional detector, or may have a three-dimensional spatial range. In some embodiments, the camera 210 may be, for example, a range detector configured to generate a two-dimensional image indicating a distance from the camera 210 to a number of points in the environment. To this end, the camera 210 may use one or more range detecting techniques. For example, the camera 210 may use a structured light technique in which the vehicle 200 illuminates an object in the environment with a predetermined light pattern, such as a grid or checkerboard pattern and uses the camera 210 to detect a reflection of the predetermined light pattern from the object. Based on distortions in the reflected light pattern, the vehicle 200 may determine the distance to the points on the object. The predetermined light pattern may comprise infrared light, or light of another wavelength. As another example, the camera 210 may use a laser scanning technique in which the vehicle 200 emits a laser and scans across a number of points on an object in the environment. While scanning the object, the vehicle 200 may use the camera 210 to detect a reflection of the laser from various points of the object. Based on a length of time it takes the laser to reflect from the object at various points, the vehicle 200 may determine the distance to the points on the object. As yet another example, the camera 210 may use a time-of-flight technique in which the vehicle 200 emits a light pulse and uses the camera 210 to detect a reflection of the light pulse from an object at a number of points on the object. In particular, the camera 210 may include a number of pixels, and respective pixels may detect the reflection of the light pulse from a point on the object. Based on a length of time it takes the light pulse to reflect from the object at various points, the vehicle 200 may determine the distance to the points on the object. The light pulse may be a laser pulse. Other range detecting techniques are possible as well, including stereo triangulation, sheet-of-light triangulation, interferometry, and coded aperture techniques, among others. The camera 210 may take other forms as well.

The camera 210 could be mounted inside a front windshield of the vehicle 200. Specifically, as illustrated in FIG. 2, the camera 210 could capture images from a forward-looking view with respect to the vehicle 200. Other mounting locations and viewing angles of camera 210 are possible, either inside or outside the vehicle 200.

The camera 210 could have associated optics that could be configured to provide an adjustable field of view. Further, the camera 210 could be mounted to vehicle 200 with a movable mount that could be configured to vary a pointing angle of the camera 210.

The vehicle 200 may include an energy-absorbing apparatus coupled to a frame of the vehicle 200. The energy-absorbing apparatus may be configured to absorb an impact force applied by an object during a collision, for example. The frame of the vehicle may include a rigid metal skeleton that supports various structures of the vehicle 200, but in other examples the frame may include any structure of the vehicle suitable for coupling to the energy-absorbing apparatus.

Figure 3:
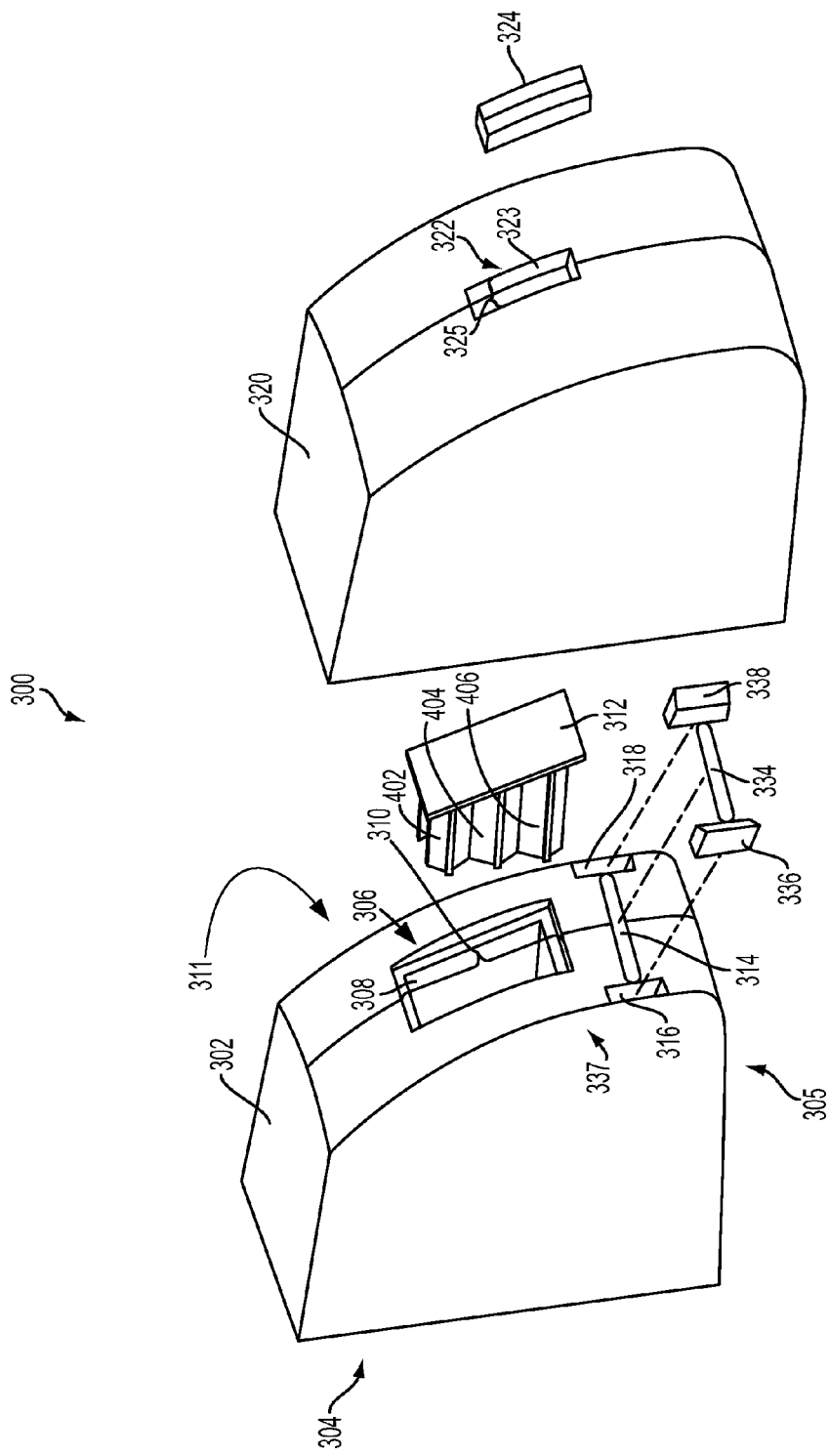
FIG. 3 illustrates an exploded view of an example energy-absorbing apparatus.

FIG. 3 illustrates an exploded view of an example energy-absorbing apparatus 300. FIG. 3 includes an inner casing 302 further including a first end 304 (i.e., a back end), a bottom end 305, a first void 306, an inner wall 308, an opening 310, a second end 311 (i.e., a front end), a third void 316, a fourth void 318, and a fifth void 314. FIG. 3 also includes a first insert 312, a horizontally elongated insert 334, a first wedge-shaped insert 336, a second wedge-shaped insert 338, an outer casing 320, a second void 322, and an object 324.

The inner casing 302 may comprise a first energy-absorbing material or first friable foam having a first stiffness, such as closed cell foam, open cell foam, polyurethane foam, XPS foam, polystyrene, phenolic, memory foam, flower foam, or any other material suitable for absorbing an impact force. A friable foam may include any foam material configured to crumble, disintegrate or otherwise be reduced to smaller pieces when impacted with a reasonably small impact force. Other types of energy-absorbing materials are possible as well such as sponges, rubbers, aluminium honeycomb, etc. The inner casing 302 may be configured to be coupled to a frame of a vehicle 740 (shown in FIGS. 7 and 8) via various attachment means (e.g., tie-down straps, fasteners, or adhesives) at the first end 304 of the inner casing 302. The first end 304 may be shaped and/or contoured to fit snugly against the frame or another portion of the vehicle 740. Alternatively or additionally, the bottom end 305 of the inner casing 302 may be configured to be coupled to the frame of the vehicle 740 and/or to fit snugly against the frame or another portion of the vehicle 740. The inner casing 302 coupling to the frame of the vehicle 740 may include directly coupling so that the inner casing 302 contacts the frame of the vehicle 740, or indirectly coupling so that the inner casing 302 is attached to the frame via other structural components of the vehicle 740. In various examples, the frame of the vehicle 740 may include a single integrated framework for attaching various vehicle components, but in other examples, the frame could include any structural component of the vehicle 740.

At the second end 311, the inner casing 302 includes the first void 306 defined by the inner wall 308 and the opening 310. In FIG. 3, the first void 306 is depicted as having a rectangular shape, but other shapes are possible. The first void 306 may be configured to receive the first insert 312. As shown in FIG. 3, the first end 304 may be opposite the second end 311 that includes the opening 310.

The first insert 312 may be made up of a second energy-absorbing material or second friable foam having a second stiffness that is different from the first stiffness of the inner casing 302. The first insert 312 may also be made up of closed cell foam, open cell foam, polyurethane foam, XPS foam, polystyrene, phenolic, memory foam, flower foam, sponges, rubbers, aluminium honeycomb, or any other material suitable for absorbing an impact force. The first insert 312 may be inserted into the first void 306 through the opening 310. Once positioned within the first void 306, the first insert 312 may or may not protrude outside the first void 306, depending on relative sizes of the first insert 312 and the first void 306. The first insert 312 may be adhesively coupled to the inner wall 308, fit snugly within the first void 306, fit loosely within the first void 306, or otherwise be coupled to the inner casing 302 within the first void 306.

In various examples, the apparatus 300 may include one or more of the inserts 312, 334, 336, and 338 placed into respective voids of the inner casing 302, with the respective voids being defined by respective inner walls and openings. In other examples, the inserts 312, 334, 336, and 338 may be coupled to the inner casing 302 without being placed into a void of the inner casing 302. That is, the inserts 312, 334, 336, and/or 338 may be mounted directly to an exterior surface of the inner casing 302.

The horizontally elongated insert 334 may form a "kicker bar" configured to direct objects that impact the horizontally elongated insert 334 upward into a potentially softer region of the vehicle, such as a central region of the inner casing 302 that includes the first insert 312. For example, the inner casing 302 may be coupled to the frame of the vehicle so that a front portion (e.g., the second end 311) of the casing forms part of a front end of the vehicle. The horizontally elongated insert 334 may be located along a bottom region of the front portion of the inner casing 302, as shown in FIG. 3. Here, a stiffness of the horizontally elongated insert 334 may be greater than the stiffness of the inner casing 302, so that an object that impacts the inner casing 302 near the horizontally elongated insert 334 may be moved off of a driving surface and into a softer region of the vehicle such as the central region of the inner casing 302 that includes the first insert 312.

The first wedge-shaped insert 336 maybe located on a first side 337 of a front portion (e.g., the second end 311) of the inner casing 302 and the second wedge-shaped insert 338 be located on a second side 339 of the front portion of the inner casing 302. As shown in FIG. 3, the first side 337 of the front portion of the inner casing 302 may be opposite the second side 339 of the front portion of the inner casing 302 (see FIG. 7). The first wedge-shaped insert 336 and the second wedge-shaped insert 338 may be composed of an energy-absorbing material or friable foam having a stiffness that differs from the stiffness of the inner casing 302. The respective stiffness of the inserts 336 and 338 may be greater than the stiffness of the inner casing 302 so that an object that impacts the inner casing 302 near the first wedge-shaped insert 336 or the second wedge-shaped insert 338 is directed toward a softer region of the inner casing 302 such as the central region that includes the first insert 312. In other examples, the first wedge-shaped insert 336 and the second wedge-shaped insert 338 may have shapes other than a wedge shape.

Although in FIG. 3 the fifth void 314, the third void 316, and the fourth void 318 are depicted as being separate voids or cavities within the inner casing 302, in other examples the voids 314, 316, and 318 may be a continuous void or cavity within the inner casing 302 and the inserts 334, 336, 338 may be formed as one continuous insert.

The (optional) outer casing 320 may be made of any material suitable for absorbing an impact force, including any of the materials that make up other portions of the apparatus 300. The outer casing 320 may be placed over the second end 311 of the inner casing 302. The outer casing 320 may include a second void 322 configured to receive an object 324. The second void 322 may be defined by an inner wall 323 and an opening 325 of the outer casing 320. In one example, the first insert 312 has a lesser stiffness than the inner casing 302, and when the outer casing 320 is placed over the inner casing 302, the first insert 312 is positioned behind the second void 322 and the object 324. The object 324 could be a vehicle component or sensor such as a headlight or a LIDAR sensor, and the first insert 312 could be positioned and configured to absorb an impact force applied to the object 324 and/or the outer casing 320.

It should be noted that in some examples, the apparatus 300 may include several layers of casings. For example, an intermediate casing (not shown) that is similar to the inner casing 302 and/or the outer casing 320 may be placed over the inner casing 302, and the outer casing 320 may be placed over the intermediate casing. In this way, several layers of "nested" casings may be used. Inserts such as the first insert 312, the horizontally elongated insert 334, the first wedge-shaped insert 336, and the second wedge-shaped insert 338 may be placed into various voids of any of the inner casing, the intermediate casing, or the outer casing.

Figure 4:
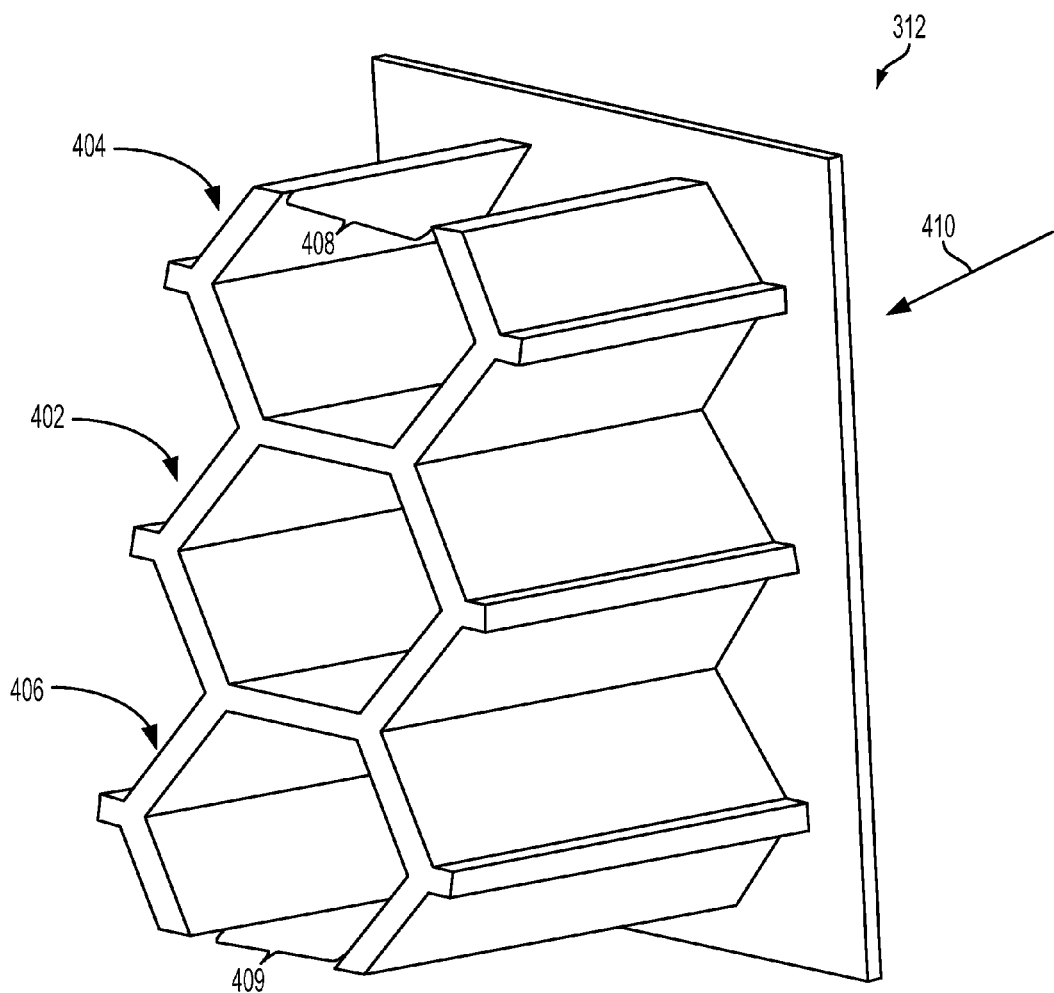
FIG. 4 illustrates an example insert of an energy-absorbing apparatus.

FIG. 4 illustrates an example insert 312 of an energy-absorbing apparatus. The insert 312 includes a first structure 402, a second structure 404, a third structure 406, an open end 408, and an open end 409.

The first structure 402 may include a three-dimensional structure made up of a friable foam material, such as a closed honeycomb or hexagonal structure depicted in FIG. 4. As the insert 312 receives the impact force 410, the first structure 402 may be configured to collapse, deform, or disintegrate to absorb the impact force 410. The first structure 402 may share one or more surfaces with the second structure 404 and/or the third structure 406.

The second structure 404 may include a three-dimensional structure made up of a friable foam material, such as an open honeycomb or hexagonal structure depicted in FIG. 4. As the insert 312 receives the impact force 410, the second structure 404 may be configured to collapse, deform, or disintegrate to absorb the impact force 410. The second structure 404 may share one or more surfaces with the first structure 402. The second structure 404 may include an open end 408 as shown in FIG. 4.

The third structure 406 may include a three-dimensional structure made up of a friable foam material, such as an open honeycomb or hexagonal structure depicted in FIG. 4. As the insert 312 receives the impact force 410, the third structure 406 may be configured to collapse, deform, or disintegrate to absorb the impact force 410. In another example, the third structure 406 may include a closed hexagonal or honeycomb structure similar to the first structure 402. The third structure 406 may include an open end 409 as shown in FIG. 4.

One or more of the structures 402, 404, and 406 may be mutually substantially identical or be substantial mirror-images. For example, in FIG. 4 the second structure 404 is a mirror-image of the third structure 406.

Figure 5:
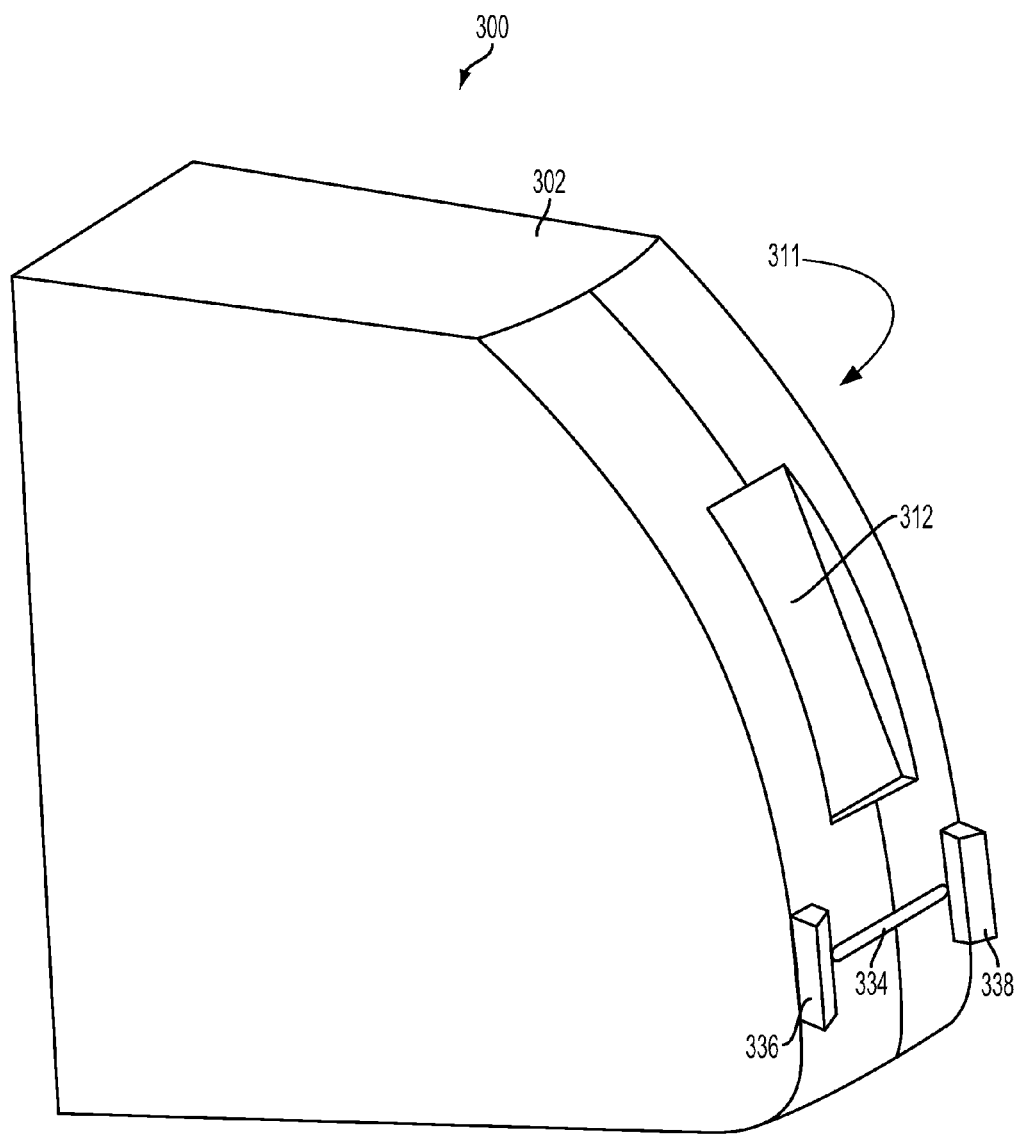
FIG. 5 illustrates an example inner casing and an example insert of an energy-absorbing apparatus.

FIG. 5 illustrates an example inner casing 302 and an example first insert 312 of an energy-absorbing apparatus 300.

As shown in FIG. 5, the first insert 312 may be located within a central region of a front portion (e.g., the second end 311) of the inner casing 302. A stiffness of the inner casing 302 may be greater than a stiffness of the first insert 312 so that damage to objects that impact the vehicle 740 and/or the inner casing 302 near the central region of the front portion of the inner casing 302 is mitigated.

When the first insert 312 is placed into a void of the inner casing 302, a front surface of the first insert 312 may be recessed from a front surface of the inner casing 302. In other examples, the front surface of the first insert 312 may extend past the front surface of the inner casing 302 or be flush with the front surface of the inner casing 302.

Figure 6:
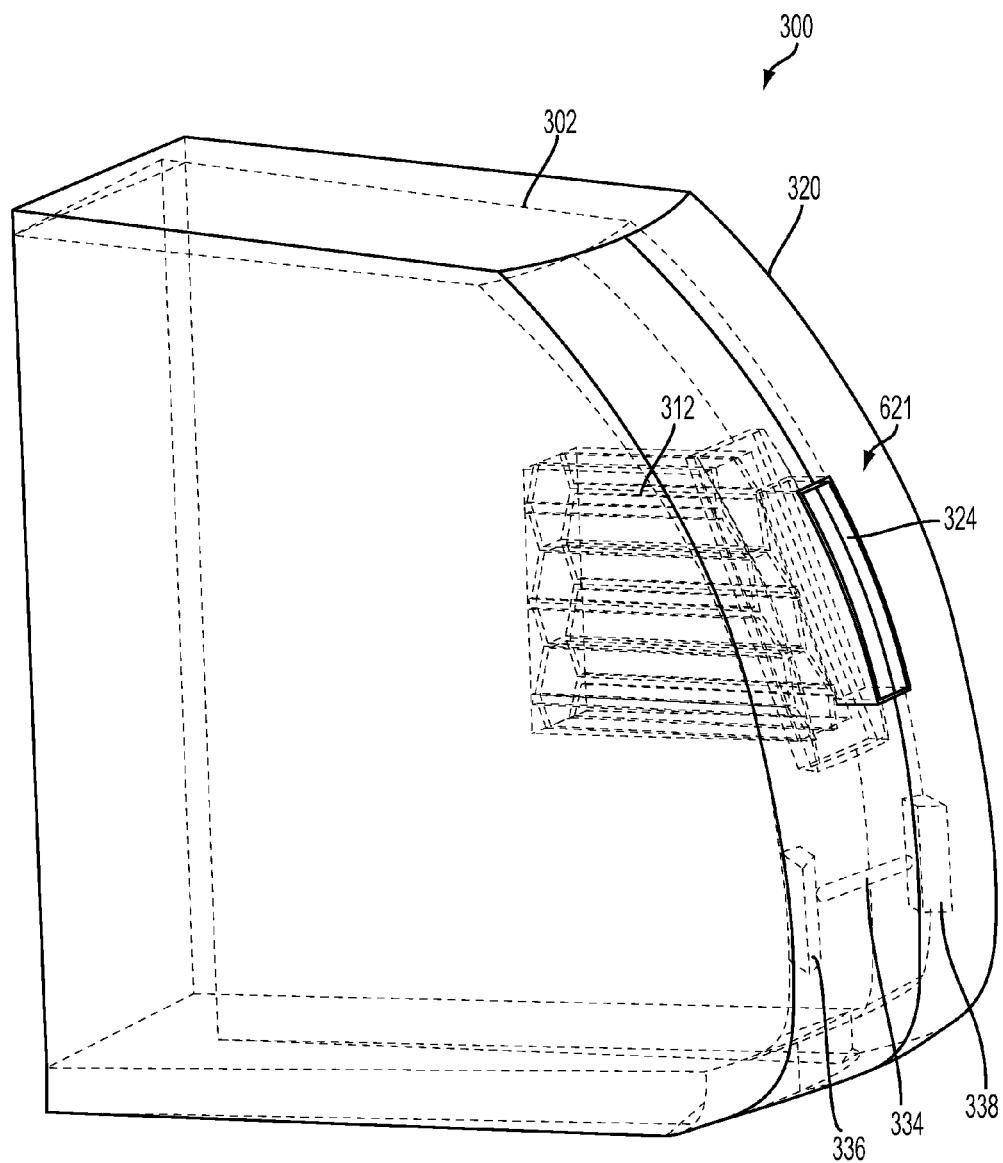
FIG. 6 illustrates an assembled view of an example energy-absorbing apparatus.

FIG. 6 illustrates an assembled view of an example energy-absorbing apparatus 300. FIG. 6 includes an inner casing 302, a first insert 312, an outer casing 320, front surface 621, an object 324, a horizontally elongated insert 334, a first wedge-shaped insert 336, and a second wedge-shaped insert 338.

As depicted in FIG. 6, the outer casing 320 is placed over a front end of the inner casing 302. The outer casing 320 may have a front surface 621 configured to couple to a front shell or fascia of a vehicle 740. For example, the object 324 may be a sensor of the vehicle 740 placed within a void of the outer casing 320 so that a front surface of the sensor is flush with or slightly recessed or slightly extended from a front surface 621 of the outer casing 320. For instance, the sensor may be a radar sensor and placement within the void of the outer casing 320 may allow the sensor to be sufficiently exposed to surroundings to collect data regarding the surroundings. In a situation in which the first insert 312 is less stiff than the surrounding inner casing 302, the placement of the object 324 within the void of the outer casing 320 in front of the first insert 312 may mitigate damage caused to objects that are impacted by the object 324 during a collision.

The inserts 334, 336, and 338 may be positioned behind the outer casing 320 to perform various functions. For example, the horizontally elongated insert 334 may be stiffer than the surrounding inner casing 302 and/or the outer casing 320. Objects that impact the apparatus 300 near the horizontally elongated insert 334 may be directed up off of a driving surface and into a central area of the apparatus 300 that includes the first insert 312, which may be less stiff than the surrounding inner casing 302. By directing an impacted object up into the central region of the apparatus 300 that includes the first insert 312, damage to the impacted object may be mitigated.

The wedge-shaped inserts 336 and 338 may be positioned behind the outer casing 320 to perform various functions. For example, the wedge-shaped inserts 336 and 338 may be stiffer than the surrounding inner casing 302 and/or the outer casing 320. Objects that impact the apparatus 300 near the first wedge-shaped insert 336 or second wedge-shaped insert 338 may be directed toward the central area of the apparatus 300 that includes the first insert 312, which may be less stiff than the surrounding inner casing 302. Or, the object may directed by the first wedge-shaped insert 336 or the second wedge-shaped insert 338 toward the horizontally elongated insert 334. Then the horizontally elongated insert 334 may direct the impacted object toward the central region of the apparatus 300. By directing an object into the central region that includes the first insert 312, damage to the impacted object may be mitigated.

Figure 7:
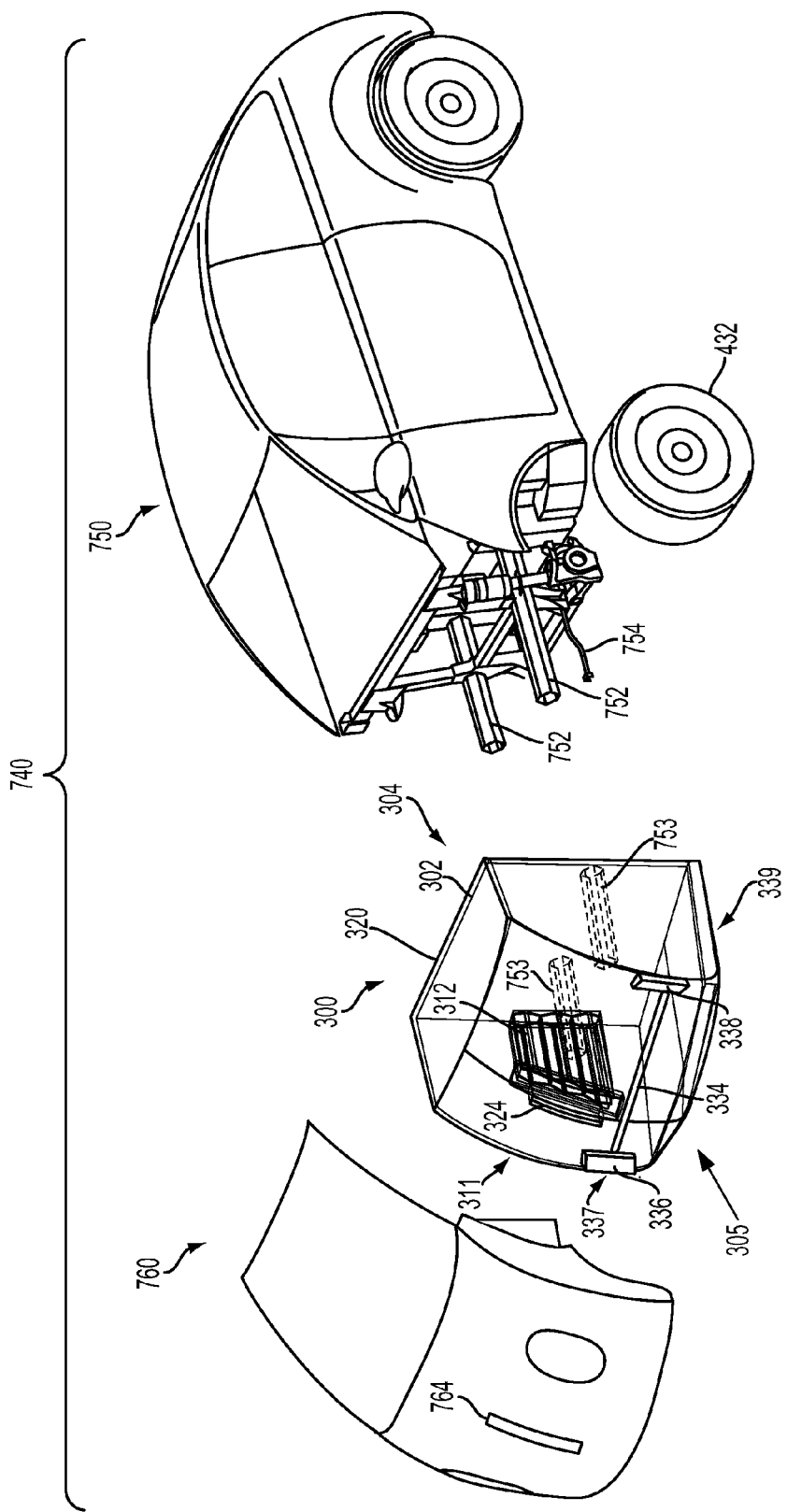
FIG. 7 illustrates an exploded view of an example vehicle that includes an example energy-absorbing apparatus.

FIG. 7 illustrates an exploded view of an example vehicle 740 that includes an example energy-absorbing apparatus 300. The vehicle 740 may comprise a front shell 760, the apparatus 300, a passenger compartment 750, a frame 752, a component/sensor cable 754, and an opening 764. The apparatus 300 may include a first end 304 and an object 324.

The first end 304 of the apparatus 300 may be configured to be coupled to a frame or another structural portion of the vehicle 740. For example, the first end 304 may be a back end of an inner casing 302 of the apparatus 300, and may include receiving holes 753 for receiving the frame 752. As an example, the frame 752 could be adhesively coupled to the apparatus 300 at the receiving holes 753. Other methods of coupling the apparatus 300 to the frame of the vehicle 740 are possible.

The object 324 may be a sensor or another component of the vehicle 740 that is configured to be electrically coupled to other portions of the vehicle 740 (e.g., the processor 113 of FIG. 1). The object 324 may be electrically coupled to the vehicle via the component/sensor cable 754. When the object 324 is placed into a void of an outer casing of the apparatus 300 as shown in FIG. 7, a front surface of the object 324 may be configured to be flush with the opening 764 of the front shell 760. Alternatively, the object 324 could be recessed or extended with respect to the opening 764 when the front shell 760 is coupled to the apparatus 300. The front shell 760 may be contoured or shaped to fit snugly over a front end of the apparatus 300.

Figure 8:
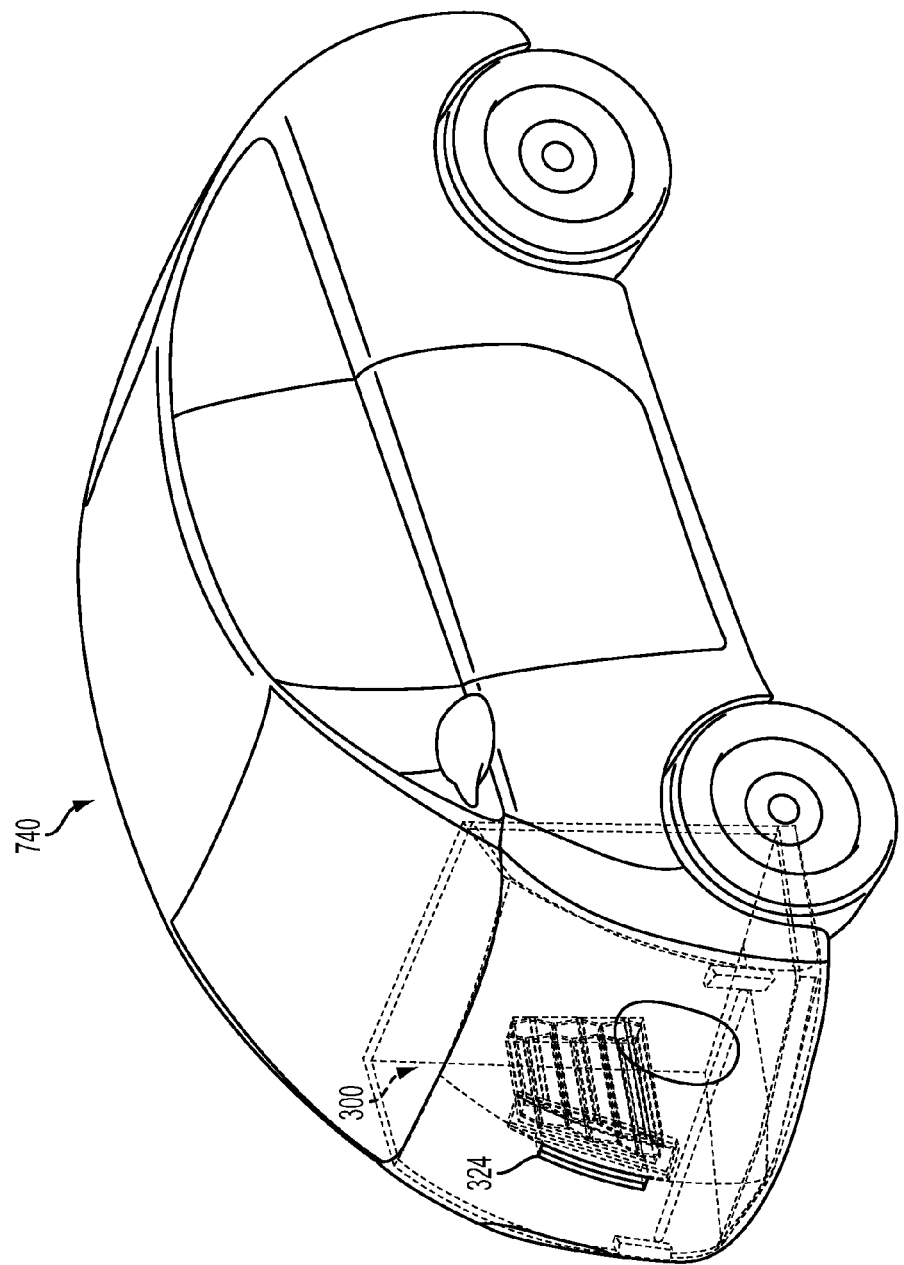
FIG. 8 illustrates an assembled view of an example vehicle that includes an example energy-absorbing apparatus.

FIG. 8 illustrates an assembled view of an example vehicle 740 that includes an example energy-absorbing apparatus 300. As shown, a front shell is placed over a front end of the apparatus 300 such that an object 324 is exposed. The object 324 (e.g., a component or sensor) may be placed within a void of an outer casing of the apparatus 300 such that a front surface of the object 324 is flush with the front shell of the vehicle 740. In situations where the object 324 is a sensor, the depicted position of the sensor may allow the sensor to collect data regarding surroundings of the vehicle. As shown in FIG. 8, the inner casing and/or outer casing of the apparatus 300 is adjacent to an exterior of the passenger compartment of the vehicle 740.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. An apparatus comprising:
   an inner casing configured to be coupled to a frame of a vehicle at a first end of the inner casing, wherein the inner casing is made of a first friable foam having a first stiffness;
   a first void within the inner casing defined by (i) an inner wall of the inner casing and (ii) an opening at a second end of the inner casing; and
   a first insert made of a second friable foam, wherein the first insert is positioned within the first void, and wherein the second friable foam has a second stiffness that is different from the first stiffness.

2. The apparatus of claim 1, wherein the first end of the inner casing is opposite the second end of the inner casing.

3. The apparatus of claim 1, wherein the first insert comprises a first structure configured to collapse as the first insert absorbs an impact force.

4. The apparatus of claim 3, wherein the first structure has a hexagonal shape.

5. The apparatus of claim 4, further comprising a second structure that has a hexagonal shape with an open end.

6. The apparatus of claim 1, further comprising:
   an outer casing placed over the second end of the inner casing; and
   a second void within the outer casing configured to receive an object.

7. The apparatus of claim 6, wherein the second stiffness is less than the first stiffness and the first insert is positioned behind the second void.

8. The apparatus of claim 1, further comprising:
   a horizontally elongated insert that is located at the second end of the inner casing below the first insert, wherein a stiffness of the horizontally elongated insert is greater than the first stiffness, and wherein the first stiffness is greater than the second stiffness.

9. The apparatus of claim 8, further comprising:
   a first wedge-shaped insert located on a first side of the second end of the inner casing, wherein the first wedge-shaped insert has a stiffness that is greater than the first stiffness; and
   a second wedge-shaped insert located on a second side of the second end of the inner casing, wherein the second side is opposite the first side, and wherein the second wedge-shaped insert has a stiffness that is greater than the first stiffness.

10. The apparatus of claim 1, further comprising:
   a first wedge-shaped insert located on a first side of the second end of the inner casing, wherein the first wedge-shaped insert has a stiffness that is greater than the first stiffness; and
   a second wedge-shaped insert located on a second side of the second end of the inner casing, wherein the second side is opposite the first side, wherein the second wedge-shaped insert has a stiffness that is greater than the first stiffness, and wherein the first stiffness is greater than the second stiffness.

11. The apparatus of claim 6, wherein the object comprises a sensor.

* * * * *